United States Patent
Maeshima

(10) Patent No.: US 7,875,201 B2
(45) Date of Patent: Jan. 25, 2011

(54) ELECTROLYTE SOLUTION, ELECTROCHEMICAL DEVICE USING SAME, AND ELECTRONIC DEVICE

(75) Inventor: Hiroyuki Maeshima, Hyogo (JP)

(73) Assignee: Panasonic Corporation, Osaka (JP)

( * ) Notice: Subject to any disclaimer, the term of this patent is extended or adjusted under 35 U.S.C. 154(b) by 628 days.

(21) Appl. No.: 11/887,242

(22) PCT Filed: May 17, 2006

(86) PCT No.: PCT/JP2006/309805

§ 371 (c)(1),
(2), (4) Date: Sep. 27, 2007

(87) PCT Pub. No.: WO2006/123681

PCT Pub. Date: Nov. 23, 2006

(65) Prior Publication Data

US 2009/0231780 A1  Sep. 17, 2009

(30) Foreign Application Priority Data

May 19, 2005 (JP) .............................. 2005-146241

(51) Int. Cl.
*H01M 6/16* (2006.01)
*H01M 10/40* (2006.01)
(52) U.S. Cl. .............. 252/62.2; 361/504; 429/188; 429/199; 429/324; 429/329; 429/341; 429/200
(58) Field of Classification Search ............... 252/62.2; 361/504; 429/188, 199, 324, 329, 341, 200
See application file for complete search history.

(56) References Cited

U.S. PATENT DOCUMENTS

| 5,709,610 | A | * | 1/1998 | Ognjanovic | .................. 473/223 |
| 5,849,432 | A | * | 12/1998 | Angell et al. | ................ 429/303 |
| 6,516,551 | B2 | * | 2/2003 | Gaber | .......................... 42/132 |
| 2006/0210883 | A1 | * | 9/2006 | Chen et al. | .................. 429/326 |

FOREIGN PATENT DOCUMENTS

| JP | 3-119077 | 5/1991 |
| JP | 7-283083 | 10/1995 |
| JP | 2004-265786 | 9/2004 |
| JP | 2004-292350 | 10/2004 |

\* cited by examiner

*Primary Examiner*—C. Melissa Koslow
(74) *Attorney, Agent, or Firm*—McDermott Will & Emery LLP

(57) ABSTRACT

An electrolyte solution used for an electrochemical device including an electrolyte and at least one of fluoro-containing compounds represented by the general formula (1):

General formula (1):

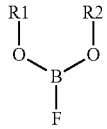

where, R1, R2 each represent a hydrogen atom, a fluorine atom, or an alkyl group of 1 to 10 carbon atoms in which R1 and R2 may be identical or different with each other, or a cyclic structure may be formed by providing bonding between the carbon atoms contained in R1 and R2.

14 Claims, 2 Drawing Sheets

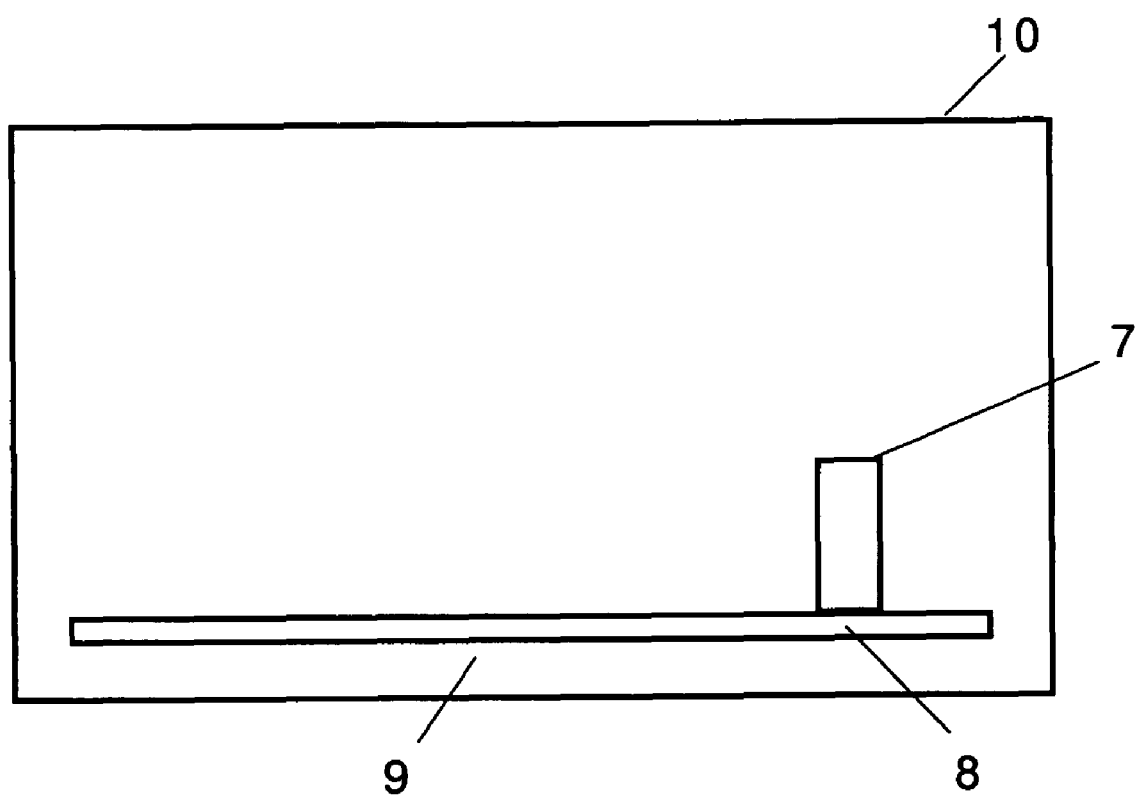

ELECTROLYTE SOLUTION, ELECTROCHEMICAL DEVICE USING SAME, AND ELECTRONIC DEVICE

RELATED APPLICATIONS

This application is the U.S. National Phase under 35 U.S.C. §371 of International Application No. PCT/JP2006/309805, filed on May 17, 2006, which in turn claims the benefit of Japanese Application No. 2005-146241, filed on May 19, 2005, the disclosures of which Applications are incorporated by reference herein.

TECHNICAL FIELD

The present invention relates to an electrolyte solution mainly used in an electric double layer capacitor, an electrochemical device using the same, and an electronic device using the electrochemical device.

BACKGROUND ART

As to electrochemical devices typically represented by electric double layer capacitors, improvement has been demanded for the performance such as higher withstanding voltage, longer life, and higher heat resistance. Therefore, it is required that the electrolyte solution used therefore is electrochemically stabler. As a conventional electrolyte solution for electric double layer capacitors, electrolyte solutions using cyclic carbonates or cyclic lactones with high electrochemical stability have been used mainly. Such electrolyte solutions are disclosed, for example, in Japanese Patent Unexamined Publication No. H07-283083. As a typical cyclic carbonate, propylene carbonate has been used generally.

However, for making the electric double layer capacitor have higher withstanding voltage, longer life, and higher heat resistance, propylene carbonate is not sufficient. Propylene carbonate has a structural portion in which two or more oxygen atoms are bonded directly to one carbon atom. Accordingly, a gas mainly of carbon dioxide ($CO_2$) is generated in a great amount along with decomposition, and this causes deterioration of the characteristics of the electrochemical device.

That is, an electrolyte solution constituted with a solvent of higher electrochemical stability than that of propylene carbonate is required. The higher electrochemical stability means herein that an electrochemical device using the same can be utilized at a higher voltage for a longer period of time while suppressing the change of characteristics thereof such as capacitance and internal resistance within a predetermined range.

DISCLOSURE OF THE INVENTION

The present invention provides, instead of propylene carbonate, an electrolyte solution containing a compound which is electrochemically stabler and does not contain a structural portion where two or more oxygen atoms are directly coupled to one carbon atom, which causes evolution of $CO_2$. Further, the invention provides an electrochemical device suppressing the degradation of the characteristics by using the electrolyte solution. Furthermore, the invention provides an electronic device improved in the working life by the use of the electrochemical device. The electrolyte solution of the present invention contains at least one kind of fluoro-containing compound represented by the general formula (1):

General formula (1):

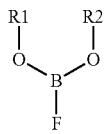

In the formula, R1, R2 each represent a hydrogen atom, a fluorine atom, or an alkyl group of 1 to 10 carbon atoms, in which R1 and R2 may be identical or different with each other. Further, a cyclic structure may be formed by providing bonding between the carbon atoms contained in R1 and R2. The electrolyte solution according to the present invention includes a fluoro-containing compound which is electrochemically stable and does not contain a structural portion where two or more oxygen atoms are directly coupled to one carbon atom to cause generation of gaseous $CO_2$. With such a constitution, deterioration of the performance of the electrochemical device using the electrolyte solution can be suppressed. Further, the electronic device using the electrochemical device can be operated stably for a long time.

BRIEF DESCRIPTION OF THE DRAWINGS

FIG. 3 is a conceptional view of an electronic device using the electric double layer capacitor shown in FIG. 1.

DETAILED DESCRIPTION OF PREFERRED EMBODIMENTS

Figure 1:
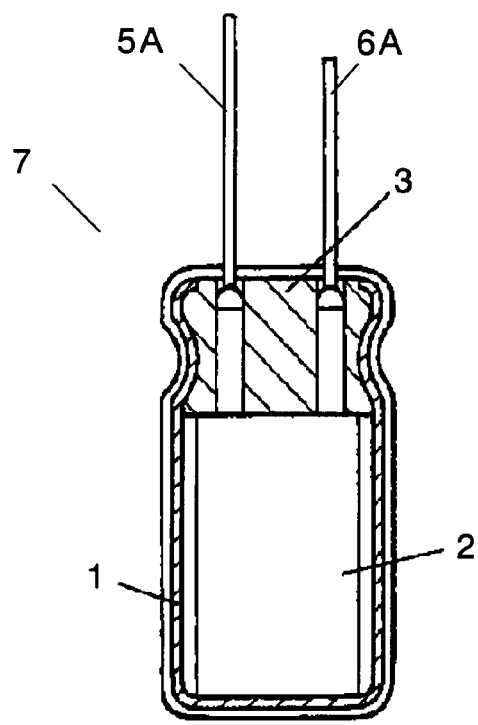
FIG. 1 is a cross sectional view showing a constitution of an electric double layer capacitor according to an embodiment of the present invention.
Figure 2:
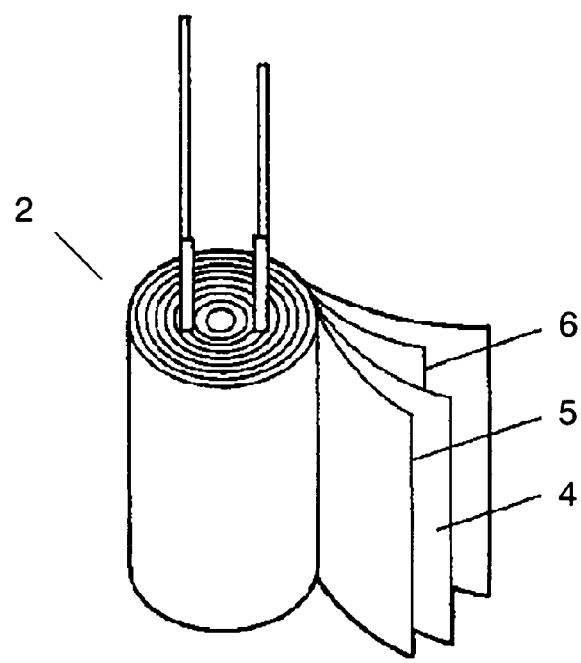
FIG. 2 is a developed perspective view showing a constitution of a capacitor element used for the electric double layer capacitor shown in FIG. 1.

FIG. 1 is a cross sectional view showing a constitution of an electric double layer capacitor as an electrochemical device according to an embodiment of the present invention, and FIG. 2 is a developed perspective view showing a constitution of a capacitor element used for the electric double layer capacitor. Electric double layer capacitor (hereinafter referred to as a capacitor) 7 has casing 1, capacitor element 2 and sealing rubber 3. As shown in FIG. 2, capacitor element 2 is composed belt-shaped separator 4, belt-shaped first electrode (hereinafter referred to as electrode) 5, and belt-shaped second electrode (herein after referred to as electrode) 6. Each surface of electrodes 5, 6 is applied with a treatment to make the surface area larger by etching or the like, and a polarizing electrode layer (not illustrated) using carbon is formed further on the surface thereof. This further increases the surface area of electrodes, 5, 6. Electrodes 5, 6 are wound via separator 4 therebetween. Electrodes, 5, 6 are connected with first terminal 5A and second terminal 6A, respectively. An electrolyte solution (not illustrated) filled in casing 1 is present between electrodes 5, and 6. Sealing rubber 3 seals an opening of casing 1 in a manner that first terminal 5A and second terminal 6A are partially exposed.

For casing 1 and collectors of electrodes 5, 6, aluminum is used generally. Casing 1 may be formed of stainless steel or nickel-plated iron, in consideration of the strength. The collectors for electrodes 5, 6 may also be formed of nickel or the like. Sealing rubber 3 is formed of a material such as ethylene propylene rubber which is not corroded by the electrolyte solution. Further, separator 4 is formed of a non-woven fabric or finely porous film such as of cellulose, polyethylene, and polypropylene. In a structure where electrodes 5, 6 are not to be short-circuited, separator 4 may be eliminated.

Then, the electrolyte solution present between electrodes 5 and 6 is described specifically. The electrolyte solution according to the present embodiment contains at least one kind of fluoro-containing compound represented by the general formula (1). Further, the electrolyte solution includes an electrolyte (supporting salt) which is dissolved in the fluoro-containing compound, ionized to form anions and cations and is stable within a range of the operation voltage of capacitor 7.

General formula (1):

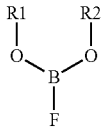

In the formula, R1 and R2 each represent a hydrogen atom, a fluorine atom or an alkyl group of 1 to 10 carbon atoms and R1 and R2 may be identical or different with each other. Further, a cyclic structure may be formed by bonding between the carbon atoms contained in R1 and R2.

The fluoro-containing compound represented by the general formula (1) includes those compounds represented by the following chemical formula (2), chemical formula (3), chemical formula (4), chemical formula (5), and chemical formula (6). The electrolyte solution according to the present embodiment contains, for example, at least one of them.

Chemical formula (2):

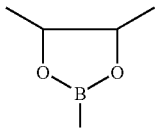

Chemical formula (3):

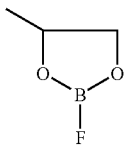

Chemical formula (4):

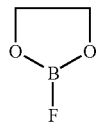

Chemical formula (5):

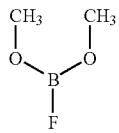

Chemical formula (6):

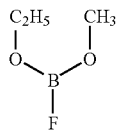

The electrochemical stability of these compounds can be evaluated by actually assembling electric double layer capacitors 7, applying a voltage thereto and measuring the change of the capacitance and the internal resistance thereof over time. It takes much time and labor to prepare such electrolyte solutions, to assemble electric double layer capacitors 7 and to conduct a voltage loading test.

In the present embodiment, the electrochemical stability of the compound is evaluated by estimating the reduction energy and the oxidation energy of the compound by using the First Principle Molecular Orbital Method, as another way. By conducting the evaluation by the First Principle Molecular Orbital Method, the physical property values of the electrolyte solution can be evaluated extremely efficiently in a short time.

Results for reduction energy ($E_{red}$), oxidation energy ($E_{ox}$) and electric dipole moment ($\mu$) calculated by 6-31+G(d) basis function by Hartree-Fock approximation are shown in Table 1.

TABLE 1

| Compound | Reduction energy Ered (Hartree) | Oxidation energy Eox (Hartree) | Ered + Eox (Hartree) | Electric dipole moment μ (Debye) |
|---|---|---|---|---|
| Butylene carbonate | 0.0733 | 0.3158 | 0.3891 | 6.3726 |
| Chemical formula (2) | 0.0592 | 0.3800 | 0.4392 | 3.9055 |
| Propylene carbonate | 0.0498 | 0.3449 | 0.3947 | 6.2898 |
| Chemical formula (3) | 0.0542 | 0.3858 | 0.4400 | 3.8433 |
| Ethylene carbonate | 0.0540 | 0.4228 | 0.4768 | 6.1894 |
| Chemical formula (4) | 0.0544 | 0.3912 | 0.4456 | 3.7665 |
| Dimethyl carbonate | 0.0753 | 0.3231 | 0.3984 | 0.4540 |
| Chemical formula (5) | 0.0596 | 0.3762 | 0.4358 | 1.1432 |
| Ethylmethyl carbonate | 0.0750 | 0.3178 | 0.3928 | 0.6173 |
| Chemical Formula (6) | 0.0566 | 0.3433 | 0.3999 | 1.0336 |

The reduction energy is determined by calculating the difference of the total energy (sum of the kinetic energy of electrons and potential energies between electrons, between electron and atom nuclei, and between atom nuclei) in each of the stable structures of a neutral molecule and a reductant thereof based on the neutral molecule as a reference. In the same manner, the oxidation energy is determined by calculating the difference of the total energy in each of the stable structures of the neutral molecule and an oxidant thereof.

Table 1 shows the results of butylene carbonate, propylene carbonate, and ethylene carbonate as the cyclic carbonate, and dimethyl carbonate and ethylmethyl carbonate as the chained carbonate for comparison. Such carbonates, whose carbon-oxygen double bond is replaced with a boron-fluorine single bond unit, correspond to the fluoro-containing compounds shown by chemical formula (2), chemical formula (3), chemical formula (4), chemical formula (5), and chemical formula (6), respectively.

In view of Table 1, the electrochemical stability of each of the compounds of chemical formula (2), chemical formula (3), chemical formula (4), and chemical formula (5) is improved compared to that of propylene carbonate. While the oxidation energy of the compound of chemical formula (6) is slightly lower than the oxidation energy of propylene carbonate, they can be regarded identical. That is, also by utilizing the compound of chemical formula (6) instead of propylene carbonate, the generation amount of $CO_2$ can be suppressed without deteriorating the electrochemical stability of the electrolyte solution.

Further, the electric dipole moment ($\mu$[Debye]) determined by the First Principle Molecular Orbital Calculation has a quantitative correlationship with the specific permittivity ($\epsilon r$) and the viscosity ($v$[cp]) of respective solvents. For example, $\mu$ is 7.0641, $\epsilon r$ is 89.6 and $v$ is 1.92 in ethylene carbonate, $\mu$ is 7.1579, $\epsilon r$ is 69.0 and $v$ is 1.38 in propylene carbonate, $\mu$ is 0.0081, $\epsilon r$ is 3.1 and $v$ is 0.6 in dimethyl carbonate, and $\mu$ is 0.3281, $\epsilon r$ is 2.9 and $v$ is 0.7 in ethylmethyl carbonate. Generally, a solvent of a higher permittivity tends to dissolve more amount of salt, and a solvent of a lower viscosity tends to improve the ion conductivity of the electrolyte solution. Therefore, by mixing two or more kinds of solvents of different permittivity or viscosity, it is possible to prepare a new solvent with different permittivity or viscosity and control the electrolyte solution characteristics.

The electric dipole moment ($\mu$[Debye]) of each of the fluoro-containing compounds shown in Table 1 is as below.

| | |
|---|---|
| $\mu$=3.9055 | Chemical formula (2) |
| $\mu$=3.8433 | Chemical formula (3) |
| $\mu$=3.7665 | Chemical formula (4) |
| $\mu$=1.1432 | Chemical formula (5) |
| $\mu$=1.0336 | Chemical formula (6) |

Then, the specific permittivity ($\epsilon r$) and the viscosity ($v$[cp]) are higher in the compounds of chemical formula (2), chemical formula (3), and chemical formula (4) and lower in the compounds of chemical formula (5) and chemical formula (6). Accordingly, by mixing at least two kinds of fluoro-containing compounds selected from the two groups respectively, it is possible to prepare new solvents of different permittivity and viscosity and control the characteristics of the electrolyte solution.

Further, the electrolyte solution containing the fluoro-containing compounds shown in the general formula (1), and chemical formula (2) to chemical formula (6) may also contain other compounds different from the fluoro-compounds described above. For example, in order to control the characteristics of the electrolyte solution, at least one compound selected from propylene carbonate, dimethyl carbonate, and ethylmethyl carbonate may be contained. However, in order to decrease the evolution amount of $CO_2$, it is advantageous to make the ratio of propylene carbonate or the like as low as possible.

For the electrolyte solution containing the fluoro-containing compound in the present embodiment, electrolytes which, when dissolved, generate $BF_4^-$, $PF_6^-$, $Cl^-$, $CF_3SO_3^-$, $NO_3^-$, $N(CF_2SO_3)_2^-$, $ClO_4^-$, $Br^-$, $I^-$, etc. as anions may be selected. However, any electrolyte which generates anion other than those described above may be used so long as it is soluble as the electrolyte solution and stable within a range of the working voltage of capacitor 7. Further, two or more kinds of anions may also be contained.

Further, an electrolyte, when dissolved, generates cation represented by the general formula (7) may be selected and dissolved.

General formula (7):

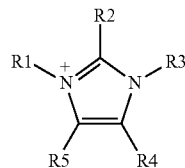

In the formula, R1, R2, R3, R4, and R5 each represent a hydrogen atom, a fluorine atom or an alkyl group of 1 to 10 carbon atoms and R1 to R5 may include those identical with each other. Further, a cyclic structure may also be formed by providing bonding between the carbon atoms contained in R1 to R5.

Specifically, 1-ethyl-3-methylimidazolium, 1,3-dimethylimidazolium, 1,2, 3-trimethylimidazolium, 1-ethyl-2,3-dimethylimidazolium, and 1,2,3,4-tetramethylimidazolium, etc. can be selected. The electrolyte which, when dissolved, generates cation represented by the general formula (7) is preferred since it is stable in a relatively wide temperature range and has high ion conductivity. However, any other electrolytes which, when dissolved, generate cation other than those described above, for example, quaternary ammonium salts such as tetraethyl ammonium may be used so long it can be dissolved as the electrolyte solution and is stable in a range of the working voltage of capacitor 7. Further, two or more kinds of cations may also be incorporated.

By adopting the constitution of impregnating capacitor element 2 of capacitor 7 constituted as described above with the electrolyte solution described above, change in the characteristics such as the capacitance and the internal resistance or swelling of casing 1 caused by gas evolution can be suppressed. That is, capacitor 7 capable of maintaining stable operation for a long time can be obtained.

Then, electronic device 10 using capacitor 7 is described with reference to FIG. 3. FIG. 3 is a conceptional view of electronic device 10 using capacitor 7. Electronic device 10 has electronic circuit 9 to be constituted with circuit board 8 on which capacitor 7 is mounted. That is, capacitor 7 is connected to electronic circuit 9. As described above, electronic device 10 includes capacitor 7. Since capacitor 7 can maintain stable operation for a long time, the life of electronic device 10 can be extended. Electronic circuit 9 may also be constituted without containing circuit board 8.

INDUSTRIAL APPLICABILITY

The electrolyte solution according to the present invention is electrochemically stable. Accordingly, deterioration of the performance of the electrochemical device can be suppressed by using the electrolyte solution. Further, use of the electrochemical device can allow the electronic device to operate stably for a long time. The electrolyte solution according to the invention is useful mainly for electric double layer capacitors.

The invention claimed is:

1. An electrolyte solution containing;
   an electrolyte, and
   at least one of fluoro-containing compounds represented by general formula (1A):

General formula (1A):

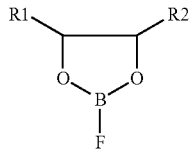

wherein, R1 and R2 each represent one of a hydrogen atom, a fluorine atom and an alkyl group of 1 to 9 carbon atoms.

2. The electrolyte solution according to claim 1, wherein the fluoro-containing compound contains a compound represented by chemical formula (2):

Chemical formula (2):

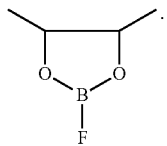

3. The electrolyte solution according to claim 1, wherein the fluoro-containing compound contains a compound represented by chemical formula (3):

Chemical formula (3):

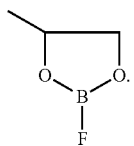

4. The electrolyte solution according to claim 1, wherein the fluoro-containing compound contains a compound represented by chemical formula (4):

Chemical formula (4):

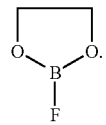

5. The electrolyte solution according to claim 1, wherein the electrolyte solution further contains a compound represented by chemical formula (5):

Chemical formula (5):

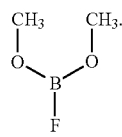

6. The electrolyte solution according to claim 1, wherein the electrolyte solution further contains a compound represented by chemical formula (6):

Chemical formula (6):

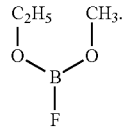

7. The electrochemical solution according to claim 1, wherein the electrolyte,
   when dissolved, generates a cation represented by general formula (7), and
   at least one of anions of $BF_4^-$, $PF_6^-$, $Cl^-$, $CF_3SO_3^-$, $NO_3^-$, $N(CF_2SO_3)_2^-$, $ClO_4^-$, $Br^-$, and $I^-$, General formula (7):

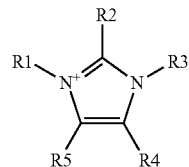

wherein, R1, R2, R3, R4, and R5 each represent one of a hydrogen atom, a fluorine atom, an alkyl group of 1 to 10 carbon atoms, and an alkyl group of 1 to 10 carbon atoms which form a ring bonded between the carbon atoms contained in another alkyl group of 1 to 10 carbon atoms.

8. An electrolyte solution containing;
   an electrolyte, and
   fluoro-containing compounds, wherein the fluoro-containing compound contains at least one of compounds selected from the compounds represented by the chemical formula (2), chemical formula (3), chemical formula (4), and at least one of a compound represented by chemical formula (5) and a compound represented by chemical formula (6):

Chemical Formula (2):

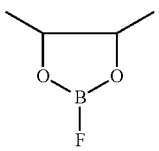

Chemical Formula (3):

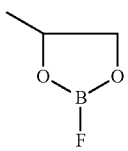

Chemical Formula (4):

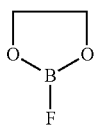

Chemical Formula (5):

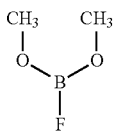

Chemical Formula (6):

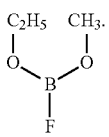

9. An electrolyte solution containing;
an electrolyte, and
at least one of fluoro-containing compounds represented by general formula (1);

General formula (1):

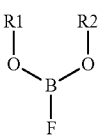

wherein, R1 and R2 each represent one of a hydrogen atom, a fluorine atom, an alkyl group of 1 to 10 carbon atoms, and an alkyl group of 1 to 10 carbon atoms which form a ring bonded between the carbon atoms contained in R1 and R2, and
wherein the electrolyte,
when dissolved, generates a cation represented by general formula (7), and at least one of anions of $BF_4^-$, $PF_6^-$, $Cl^-$, $CF_3SO_3^-$, $NO_3^-$, $N(CF_2SO_3)_2^-$, $ClO_4^-$, $Br^-$, and $I^-$, General formula (7):

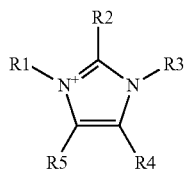

wherein, R1, R2, R3, R4, and R5 each represent one of a hydrogen atom, a fluorine atom, an alkyl group of 1 to 10 carbon atoms, and an alkyl group of 1 to 10 carbon atoms which form a ring bonded between the carbon atoms contained in another alkyl group of 1 to 10 carbon atoms.

10. The electrolyte solution according to claim 9, wherein the fluoro-containing compound contains at least one of compounds selected from the compounds represented by the chemical formula (2), chemical formula (3), chemical formula (4), and at least one of a compound represented by chemical formula (5) and a compound represented by chemical formula (6):

Chemical Formula (2):

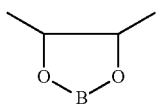

Chemical Formula (3):

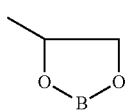

Chemical Formula (4):

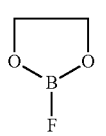

Chemical Formula (5):

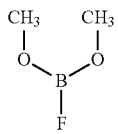

Chemical Formula (6):

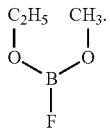

11. An electrochemical device comprising:
a first electrode and a second electrode,
the electrolyte solution according to claim 1, and
a casing containing the first electrode, the second electrode, and the electrolyte solution.

12. An electronic device comprising:
the electrochemical device according to claim 11, and
an electric circuit connected with the electrochemical device.

13. An electrochemical device comprising:
a first electrode and a second electrode,
the electrolyte solution according to claim 9, and
a casing containing the first electrode, the second electrode, and the electrolyte solution.

14. An electronic device comprising:
the electrochemical device according to claim 13, and
an electric circuit connected with the electrochemical device.

\* \* \* \* \*